(12) United States Patent
Clemm et al.

(10) Patent No.: US 7,844,949 B2
(45) Date of Patent: Nov. 30, 2010

(54) COMPUTER METHOD AND APPARATUS FOR SOFTWARE CONFIGURATION MANAGEMENT REPOSITORY INTEROPERATION

(75) Inventors: Geoffrey M. Clemm, Concord, MA (US); Paul Komar, Lexington, MA (US); John R. Vasta, Harvard, MA (US)

(73) Assignee: International Business Machines Corporation, Armonk, NY (US)

( * ) Notice: Subject to any disclaimer, the term of this patent is extended or adjusted under 35 U.S.C. 154(b) by 1020 days.

(21) Appl. No.: 11/610,838

(22) Filed: Dec. 14, 2006

(65) Prior Publication Data
US 2008/0147693 A1    Jun. 19, 2008

(51) Int. Cl.
    G06F 9/44     (2006.01)
    G06F 17/30     (2006.01)

(52) U.S. Cl. .................. 717/121; 707/999.203
(58) Field of Classification Search .................. 717/121; 707/999.203
See application file for complete search history.

(56) References Cited

U.S. PATENT DOCUMENTS 6,662,357 B1 * 12/2003 Bowman-Amuah ......... 717/120
7,277,904 B2 * 10/2007 Baird .............................. 1/1
2005/0086384 A1 * 4/2005 Ernst ........................ 709/248
2006/0155729 A1 * 7/2006 Aahlad et al. ............... 707/100

OTHER PUBLICATIONS

An Oracle Technical White Paper, "Using Oracle Repository for Software Configuration Management", Oracle, Feb. 2001, pp. 1-16.*

* cited by examiner

*Primary Examiner*—Wei Y Zhen
*Assistant Examiner*—Chih-Ching Chow
(74) *Attorney, Agent, or Firm*—Hamilton, Brook, Smith & Reynolds, P.C.

(57) ABSTRACT

A computer method and apparatus for software configuration management is disclosed. Given a subject software system under development, the subject software system including one or more components and being represented by one or more configurations in a first stream, the invention method and apparatus stores the first stream on a first repository. Software development of one component of the subject software system is enabled in a working stream stored on a second repository. The working stream has one or more configurations of the one component. For the one component, the invention method and apparatus create a second stream on the first repository, create in the second repository a copy of the second stream and create in the first repository a copy of the working stream. When a configuration of the working stream stored on the second repository is of interest to the subject software system, (i) a replication of that configuration is made to the first repository copy of the working stream and (ii) the resulting copy of the working stream is merged with the second stream on the first repository. The replication and merge enable merge conflicts to be resolved.

13 Claims, 4 Drawing Sheets

COMPUTER METHOD AND APPARATUS FOR SOFTWARE CONFIGURATION MANAGEMENT REPOSITORY INTEROPERATION

BACKGROUND OF THE INVENTION

A Software-Configuration-Management (SCM) system is used to manage the development of configurations of a software system. When a software system is being developed in an SCM repository, the historical sequence of configurations of that software system is called a "stream". When a developer wants to create a new configuration of that software system, the developer "accepts" the latest configuration from the stream for that software system into a "workspace". The developer then makes changes to the configuration in the workspace, and when the developer has created the desired new configuration in the workspace, the developer "delivers" the configuration in the workspace to the stream, which adds that configuration to the end of the stream, making it the latest configuration of that stream.

In order to avoid over-writing configurations created by other developers, before a developer can deliver to the stream, the developer must first accept into the workspace the latest configuration of the stream. If the latest configuration contains changes to the same files or directories that the developer has changed, this results in "merge conflicts" for those files or directories in the workspace. These conflicts must be resolved by the developer (via automatic or manual merge tools) before the configuration of the workspace can be delivered to the stream.

It is common for multiple SCM repositories to be in use in a single organization. In some cases, this is because no one SCM repository has all the features needed by the organization. In other cases, this is because it takes a long time to transition all of the business processes and projects from one SCM repository to another, and so both SCM repositories remain in use for an extensive period of time. When a common software component is shared by software systems that are being developed with different SCM repositories, some mechanism must be provided to allow developers of those software systems to develop and share new configurations of the common software component.

A common approach to this problem is to have the developers learn how to load configurations of the shared components from their respective SCM repositories into a common file system, and then to use the build system to integrate the files from the different SCM repositories.

But there are several important problems with this approach. In particular, a software project wants to record the configuration of all components needed for a particular configuration of the software system, which would require recording relationships between different SCM repositories. In addition, a developer will often need to make changes to the shared component, but interactions with an SCM system to make changes to a configuration can be very complex (especially to reconcile and merge parallel changes), so attempting to do so with multiple SCM repositories can be very confusing and result in significant errors.

SUMMARY OF THE INVENTION

The present invention addresses the foregoing problems of the prior art. In particular, when a software system S is being developed in stream SX in SCM repository X, but a component C of software system S is being developed in stream CY in SCM repository Y, the present invention creates a stream CX for component C in SCM repository X. In addition, the present invention creates in SCM repository Y a stream CXY that is a copy of CX and creates in SCM repository X a stream CYX that is a copy of CY. When a configuration in stream CY is of interest to software system S, the present invention enables that configuration to be "replicated" to CYX, which is then "merged" to CX. Conversely, when a configuration in stream CX is of interest to the developers of CY, the present invention enables that configuration to be replicated to CXY, which is then merged to CY. This allows the developer to choose whether he wants to perform the SCM operations (including the merge) using SCM repository X or SCM repository Y. The replication minimizes the number of versions that must be copied to the other repository, while maintaining correct predecessor and activity information for supporting intelligent merging.

In a preferred embodiment, a computer method and apparatus for managing software configurations includes:
given a subject software system under development, the subject software system including one or more components and being represented by one or more configurations in a first stream, storing the first stream on a first repository;
enabling software development of one component of the subject software system in a working stream stored on a second repository, the working stream having one or more configurations of the one component;
for the one component, creating a second stream on the first repository, the second stream having one or more configurations of the one component;
creating in the second repository a copy of the second stream;
creating in the first repository a copy of the working stream; and
when a configuration of the working stream stored on the second repository is of interest to the subject software system, (i) replicating that configuration to the first repository copy of the working stream and (ii) merging the resulting copy of the working stream with the second stream on the first repository.

BRIEF DESCRIPTION OF THE DRAWINGS

The foregoing will be apparent from the following more particular description of example embodiments of the invention, as illustrated in the accompanying drawings in which like reference characters refer to the same parts throughout the different views, The drawings are not necessarily to scale, emphasis instead being placed upon illustrating embodiments of the present invention.

DETAILED DESCRIPTION OF THE INVENTION

A description of example embodiments of the invention follows.

Figure 1:
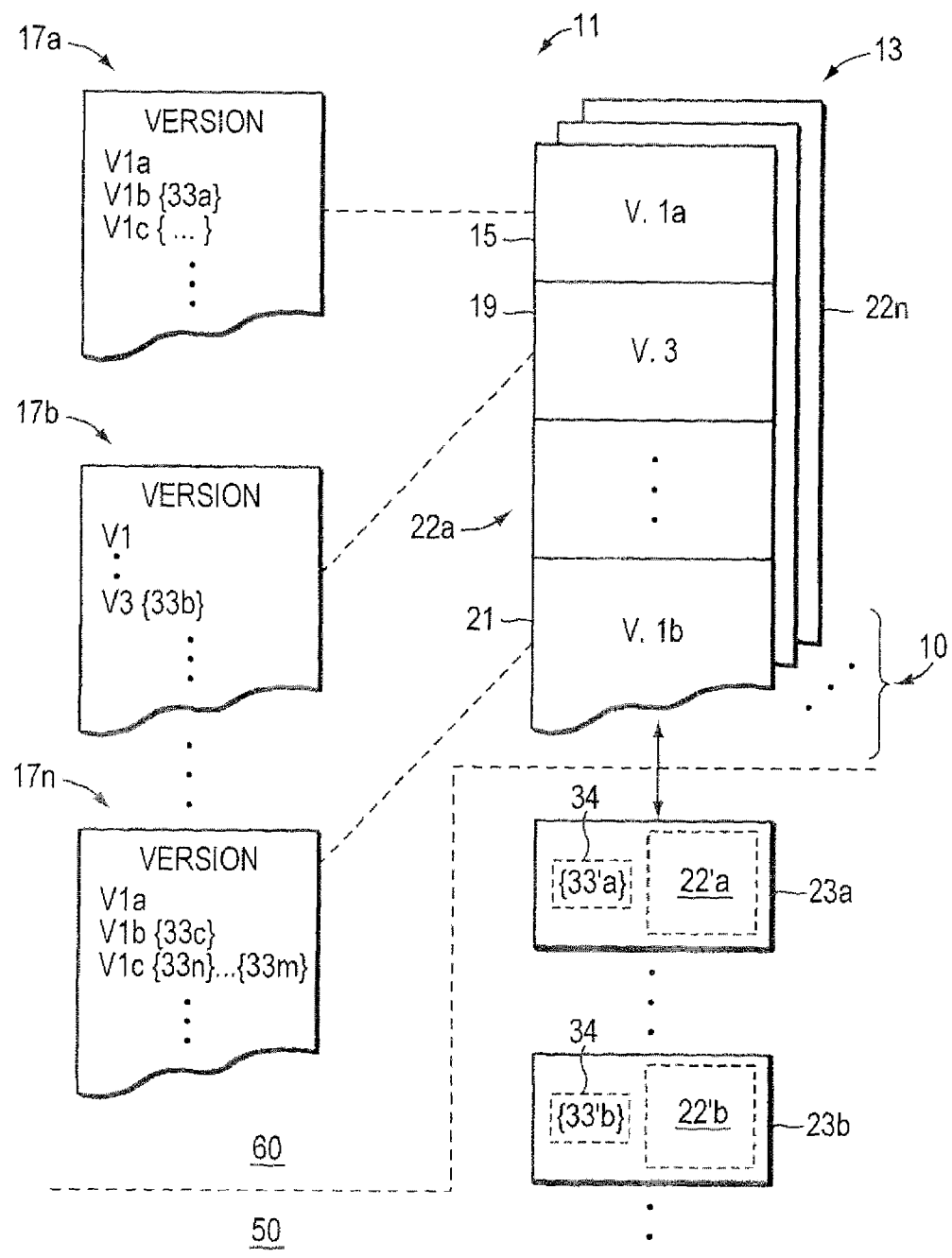
FIG. 1 is a schematic illustration of a software configuration management system (SCM) embodying the present invention.

Illustrated in FIG. 1 is an example software configuration management system (SCM) 11 embodying the present invention. Configuration management system 11 provides a workspace view of a subject software program (software system generally) 13 and various information regarding the subject software program 13. The software program 13 is formed of one or more artifacts 15, 19, 21. Each artifact 15, 19, 21 has respective versions, e.g., V.1a, V.3, V.1b, etc. Each configuration 22 of a subject software program 13 employs respective versions of the artifacts 15, 19, 21. One of the illustrated configurations 22a of subject software program 13 in FIG. 1 is formed of version V.1a of artifact 15, version V.3 of artifact 19 and version V.1b of artifact 21. Other configurations 22 of subject software program 13 use other versions of artifacts 15, 19, 21.

Information regarding the versions of an artifact 15, 19, 21 is stored in a respective version history table of the artifact 15, 19, 21. In particular, change set information (the change set 33 to which a version belongs) is recorded in respective artifact version history table 17. FIG. 1 illustrates the one configuration 22a of subject software program 13 having version history table entry 17a for artifact 15, version history table entry 17b for artifact 19 and version history table entry 17n for artifact 21. It is understood that the configuration management system 11 stores the foregoing information for each configuration 22 of program 13.

Configuration management system 11 enables users to produce and work with (edit, test, redesign, etc.) such different configurations 22 of subject software program or system 13. The historical sequence of configurations 22 of the software system/program 13 is a stream 10 stored in a repository 94 (FIG. 3) of the SCM 11. Each artifact 15, 19, 21 is a persistent result of work done by a user, typically persisted in a file system such as models and source code. An "activity" is used to track the results of work done by a user. The "change set" 33 of an activity is the set of changes to artifacts 15, 19, 21 made by the practitioner to perform the activity. A "workspace" 23 is used to define the work environment of a user— to contain the artifacts 15, 19, 21 required by that user and the change sets that track the results of performing those activities. The workspace 23 is said to "accept" the activity change sets that define the current or working configuration 22'.

Restated, all changes to software artifacts 15, 19, 21 are made in the context of a workspace 23a, b, c (generally 23). Each user or member of a team has a respective workspace 23 on respective client machines 50. When a user wants to create a new configuration 22' of the software system/program 13, he "accepts" the latest configuration 22a from the stream 10 for that software system 13 into his "workspace" 23. The user then makes changes to the configuration 22a in the workspace 23. The workspace 23 identifies a respective change set 33' in an accepted set 34 that indicates or provides the logical change currently being performed to a configuration 22' of that workspace. When the user has created tie desired new configuration 22' in the workspace 23, the user "delivers" the resulting configuration 22' from the workspace 23 to the stream 10, which adds that configuration 22' to the end of the stream 10, making it the latest configuration of that stream 10.

There may be multiple SCM repositories 94 each with a respective stream 10, i.e., historical sequence of configurations 22, of a subject software program/system 13. For purposes of clarity in illustration, FIG. 1 only depicts one such repository 94 and stream 10. It is understood that any other repositories 94 and streams 10 would be similar to those shown and described in FIG. 1.

When changes to a shared component are only being made in one repository 94, or if the users (developers) in different repositories 94 "take turns" (i.e., do not make changes in their repository 94a until changes from the other repository 94b have been merged into their repository 94a), a merge can be totally automated, and no user intervention is required. If changes are made in parallel among repositories 94a, b, then there potentially will be "physical merge conflicts" that are discovered during the merge (when the same file or directory has been changed in parallel), or "logical merge conflicts" that are discovered during compilation and testing (when different files or directories have been changed in parallel, but the combination of those changes produce inter-file semantic conflicts).

When a merge conflict (either physical or logical) is detected, the present invention enables the user to select in which repository 94a, b he would like to resolve the merge conflict. In some cases, this will be based on which repository 94 has more effective merge support. In other cases, this will just be the repository 94 that is more familiar to the user performing the merge.

Figure 4:
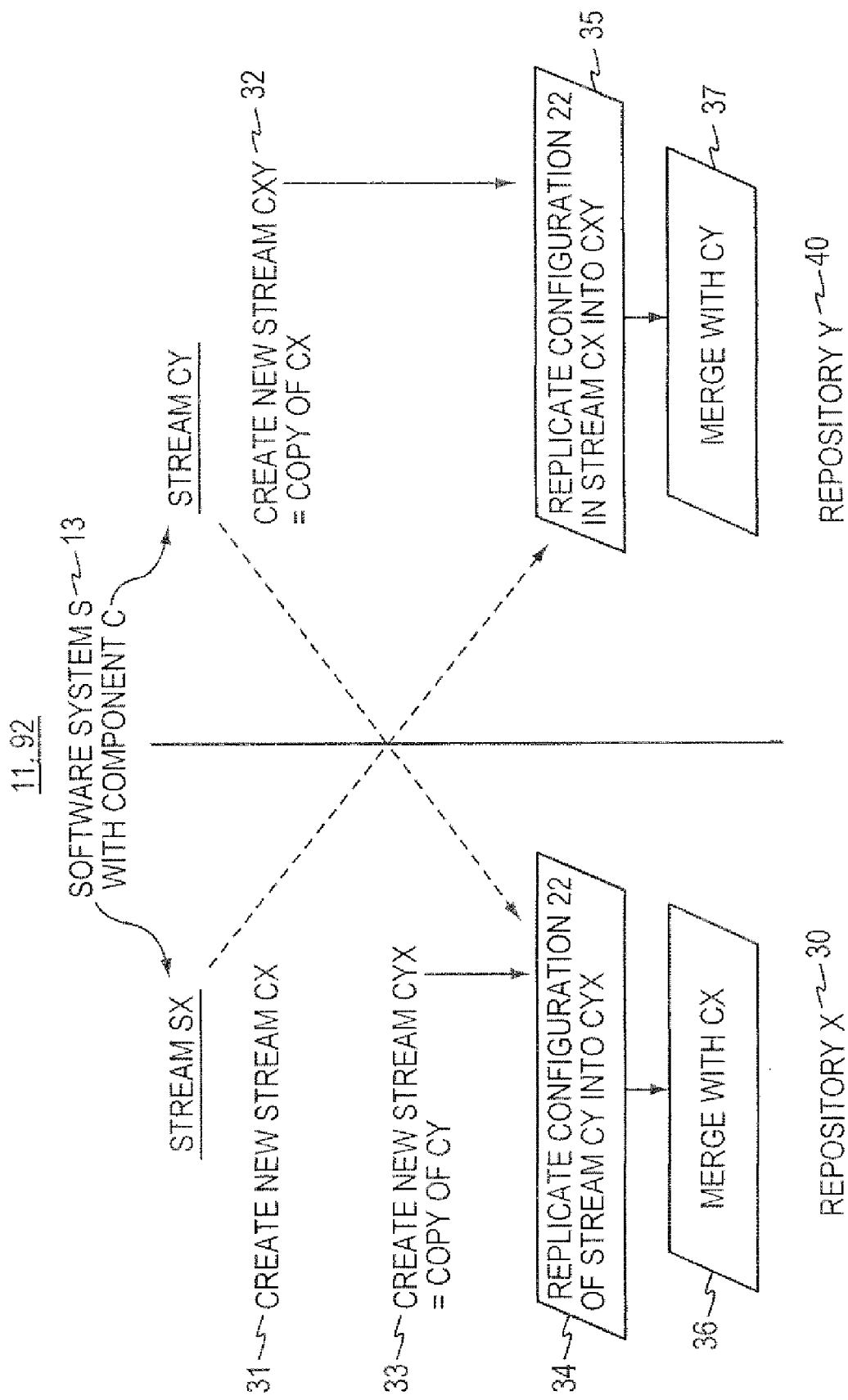
FIG. 4 is an illustration of an example merge conflict resolution according to the principles of the present invention.

Turning to the example shown in Fig. 4, there is a software system S 13 being developed in stream SX in SCM Repository X 30. When a component C of software system S is being developed in stream CY in SCM Repository Y 40, the present invention 11 creates a stream CX (step 31) for component C in SCM Repository X 30. In addition, the present invention 11 creates (step 32) in SCM Repository Y 40 a stream CXY that is a copy of stream CX and creates (step 33) in SCM Repository X 30 a stream CYX that is a copy of stream CY. When a configuration 22 in stream CY is of interest to software system S, the present invention 11 (step 34) enables that configuration 22 to be "replicated" to stream CYX, which is then "merged" to stream CX. Conversely, when a configuration 22 in stream CX is of interest to the developers of stream CY, the present invention 11 (step 35) enables that configuration 22 to be replicated to stream CXY, which is then merged to stream CY. This allows the developer to choose whether he wants to perform the SCM operations (including the merge) using SCM Repository X (at 30) or SCM Repository Y (at 40). The replication 34, 35 minimizes the number of versions that must be copied to the other repository, while maintaining correct predecessor and activity information for supporting intelligent merging.

Suppose that the conflict was detected during the merge of stream CYX to stream CX (at step 34). If the user selects to resolve the conflicts in SCM Repository X (the repository 30 in which the conflict was detected), then the user simply continues with the merge 36. If instead the developer selects to resolve the conflicts in SCM Repository Y 40, then the merge of stream CYX to stream CX (step 36) is cancelled, the configuration of stream CX is replicated to stream CXY, and a merge of stream CXY to stream CY is initiated (step 35). After the merge 37 of stream CXY to stream CY has been completed by the developer (with all physical and logical conflicts resolved), the resulting new latest configuration of stream CY is automatically replicated to stream CYX (shown at dashed line to step 34), and a new merge 36 of stream CYX to stream CX is automatically invoked. If no changes have been made to stream CX since stream CX was replicated to stream CXY, this merge 36 will be trivial, and the merged configuration will be delivered to stream CX. If changes have been made to stream CX that result in new merge conflicts, then the process 34, 35 must be repeated. If the developer wishes to ensure that no new merge conflicts will occur, the developer may lock stream CX during the merge process 36, 37.

When a stream in one repository (the "source" repository) is replicated to a stream in another repository (the "target" repository), in order to avoid replicating a version that has already been replicated, when a version is replicated, it is annotated with the ID of the version in the target repository to which it was replicated. In order to avoid the time and space overhead of recreating all of the intermediate versions in the target repository, only the version of a file currently selected by the source stream is replicated to the target stream. But in order to perform an effective three-way merge of the replicated version, it is important that the common-ancestor information be available in the target repository. To produce the common-ancestor information, when a new version is replicated from the source repository, each predecessor path from the source version to its initial version is traversed until a predecessor version that has already been replicated (i.e. one that has been annotated by the ID of a version in the target repository) is encountered. The replicas of these versions are made the predecessors of the newly replicated version in the target repository.

The merge process (and many other processes in an SCM repository) depends on the availability of "activity" information which associates a change to a file or directory with the logical activity that motivated that change (where a variety of terms for an activity are used in different SCM repositories, such as "change-request", "defect", "enhancement-request", "bug", "change-set", or "modification-request "). In order to make activity information available on replicated versions, the activity information associated with a replicated version must also be replicated into the target SCM repository. In particular, the source object for each activity that affected a replicated version must be replicated to the target repository, and that replicated activity must be associated with the appropriate replicated versions. In general, the activities that affect a particular version consist of the activity that produced that version as well as all activities that produced any predecessor of that version. Since only a subset of the predecessors of a version are replicated (i.e., only those predecessors that were explicitly replicated), in order to have complete activity information on the target version, the activities that produced the non-replicated predecessors of the source version must be replicated, and then those activity replicas must all be associated with the newly replicated version.

Figure 2:
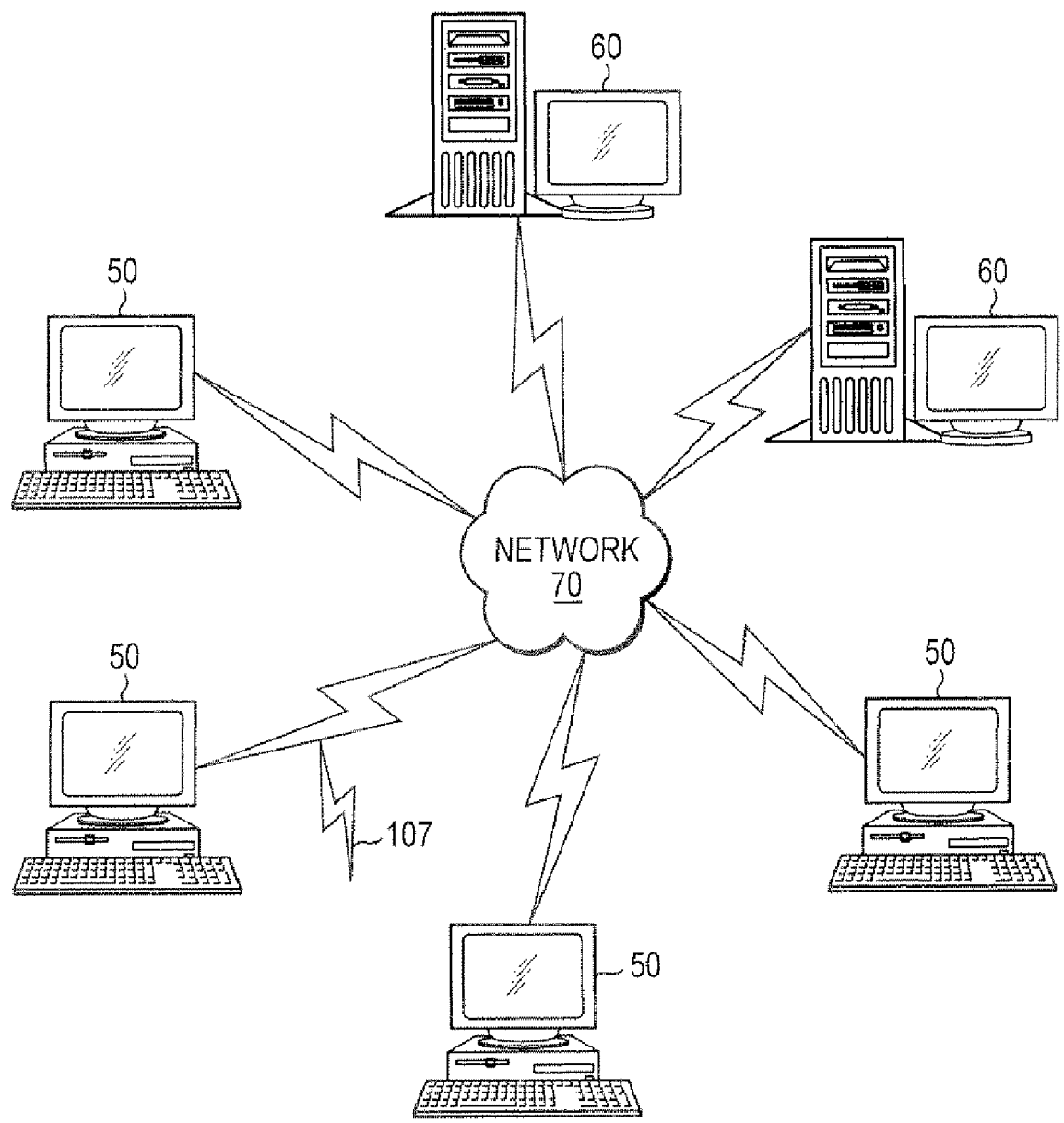
FIG. 2 is a schematic view of a computer network environment in which embodiments of the present invention are operated.

FIG. 2 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 3:
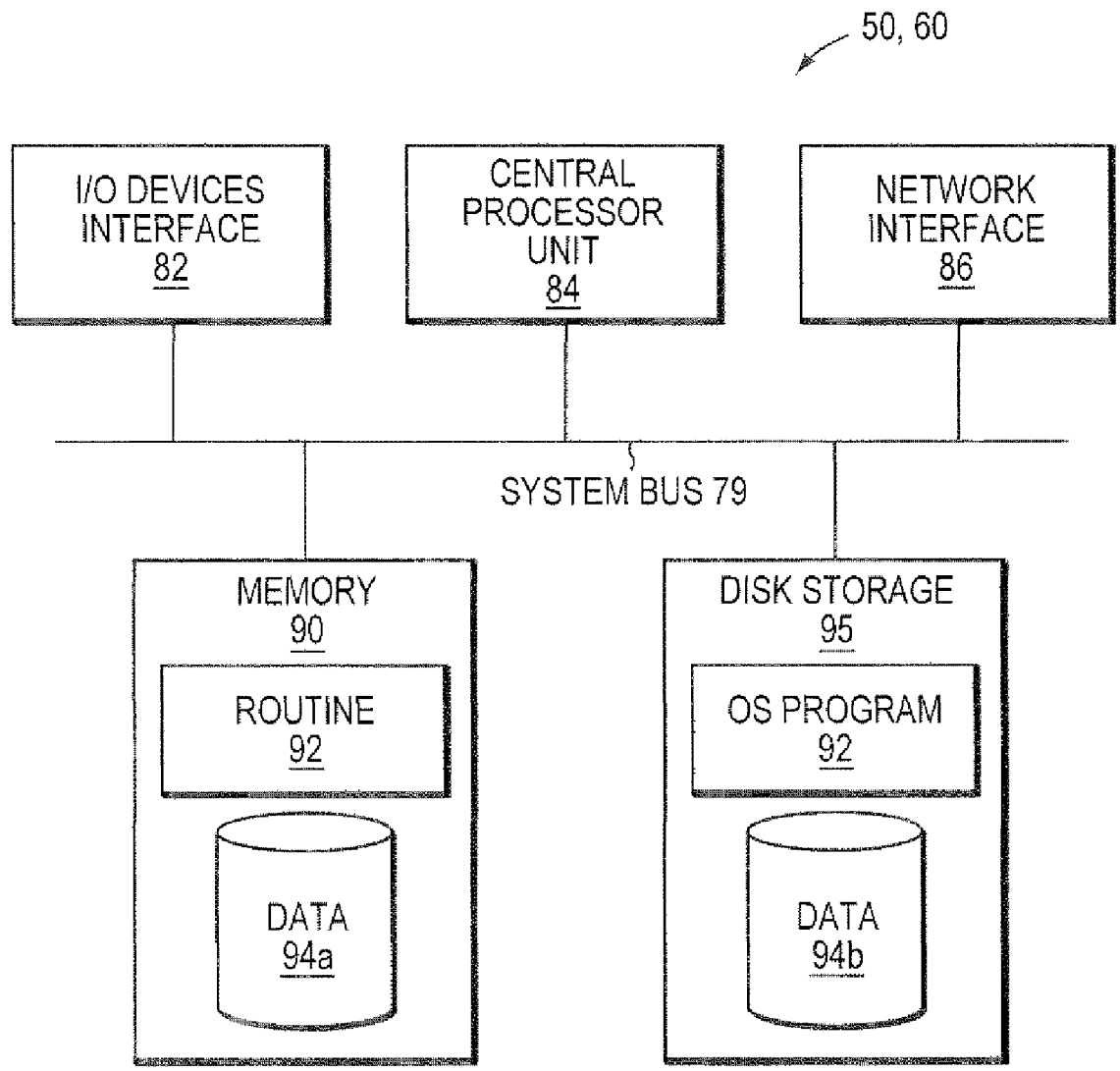
FIG. 3 is a block diagram of computer nodes of FIG. 2.

FIG. 3 is a diagram of the internal structure of a computer (e.g., client processor/device 50 or server computers 60) in the computer system of FIG. 2. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 2). Memory 90 provides volatile storage for computer software instructions 92 and data 94 used to implement an embodiment of the present invention (e.g., repositories 30, 40, streams 10, CX, CY, replication and merge process 31-37, artifact histories 17 and workspaces 23 detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

While this invention has been particularly shown and described with references to example embodiments thereof, it will be understood by those skilled in the art that various chances in form and details may be made therein without departing from the scope of the invention encompassed by the appended claims.

What is claimed is:

1. A computer method for managing software configurations comprising the steps of:
   using a computer, given a subject software system under development, the subject software system including one or more components and being represented by one or more configurations in a first stream, storing the first stream on a first repository;
   enabling software development of one component of the subject software system in a working stream stored on a second repository, the working stream having one or more configurations of the one component;
   for the one component, creating a second stream on the first repository, the second stream having one or more configurations of the one component;
   creating in the second repository a copy of the second stream;
   creating in the first repository a copy of the working stream; and
   when a configuration of the working stream stored on the second repository is of interest to the subject software system, (i) replicating that configuration to the first repository copy of the working stream and (ii) merging resulting copy of the working stream with the second stream on the first repository,
   when a second stream configuration in the second stream on the first repository is of interest for the development on the second repository, (iii) replicating that second stream configuration to the second repository copy of the second stream; and (iv) merging resulting copy of the second stream with the working stream on the second repository;
   wherein the steps of replicating and merging further enables merge conflicts to be resolved, and a user to have a choice of which repository to perform software configuration management operations on.

2. A method as claimed in claim 1 wherein each step of replicating minimizes number of versions that must be copied between the first and second repositories but maintains ability to merge configurations.

3. A method as claimed in claim 1 wherein the operations include any of: merging changes and merging configurations.

4. A method as claimed in claim 1 wherein if a merge conflict is detected, and if the developer selects to resolve the conflict in the second repository, the step of replicating the second stream configuration and merging the resulting copy of the second stream is used to resolve the conflict.

5. Computer apparatus comprising computer removable storage medium for managing software configurations, comprising:
   a first stream of a subject software system, the subject software system being formed of one or more components and being represented by one or more configurations in the first stream, the first stream being stored on a first repository;
   a work stream stored on a second repository, the work stream enabling software development of one component of the subject software system and having one or more configurations of the one component;
   a second stream created on the first repository for the one component, the second stream having one or more configurations of the one component;
   a copy of the second stream stored on the second repository;
   a copy of the work stream stored on the first repository; and
   when a configuration of the work stream stored on the second repository is of interest to the subject software system, a processor routine (i) replicating that configuration to the first repository copy of the work stream and (ii) merging resulting copy of the work stream with the second stream on the first repository;
   when a second stream configuration in the second stream on the first repository is of interest for the development on the second repository, a processor (iii) replicating that second stream configuration to the second repository copy of the second stream; and (iv) merging resulting copy of the second stream with the working stream on the second repository;
   wherein replicas resulting from the processor routine and the processor further enable merge conflicts to be resolved, and a user to have a choice of which repository to perform software configuration management operations on.

6. Apparatus as claimed in claim 5 wherein replicas resulting from the processor routine and the processor minimize number of configurations that need to be copied between the first and second repositories but maintains ability to merge configurations.

7. Apparatus as claimed in claim 5 wherein the operations include any of: merging changes and merging configurations.

8. Apparatus as claimed in claim 5 wherein the replicas further enable resolution of a merge conflict.

9. A software configuration management system comprising:
   a processor;
   given a subject software system under development, the subject software system including one or more components and being represented by one or more configurations in a first stream, means for storing the first stream on a first repository;
   software development means for enabling development of one component of the subject software system in a working stream stored on a second repository, the working stream having one or more configurations of the one component;

for the one component, stream creation means for creating a second stream on the first repository: the second stream having one or more configurations of the one component;

copy means for creating a copy of the second stream in the second repository and for creating a copy of the working stream in the first repository; and when a configuration of the working stream stored on the second repository is of interest to the subject software system, means for (i) replicating that configuration to the first repository copy of the working stream and (ii) merging resulting replication with the second stream on the first repository, when a second stream configuration in the second stream on the first repository is of interest for the development on the second repository, means for (iii) replicating that second stream configuration to the second repository copy of the second stream; and (iv) merging resulting copy of the second stream with the working stream on the second repository;

wherein each means for merging and replicating further enables merge conflicts to be resolved, and a user to have a choice of which repository to perform software configuration management operations on.

10. A system as claimed in claim 9 wherein each means for replicating minimizes number of versions that must be copied between the first and second repositories but maintains ability to merge configurations.

11. A system as claimed in claim 9 wherein the operations include any of: merging changes and merging configurations.

12. A computer program product comprising a computer-readable storage medium having a computer readable program, wherein the computer readable program when executed by a computer causes:

given a subject software system under development, the subject software system including one or more components and being represented by one or more configurations in a first stream, storing the first stream on a first repository;

enabling software development of one component of the subject software system in a working stream stored on a second repository, the working stream having one or more configurations of the one component;

for the one component, creating a second stream on the first repository, the second stream having one or more configurations of the one component;

creating in the second repository a copy of the second stream;

creating in the first repository a copy of the working stream;

when a configuration of the working stream stored on the second repository is of interest to the subject software system, (i) replicating that configuration to the first repository copy of the working stream and (ii) merging resulting copy of the working stream with the second stream on the first repository; and when a second stream configuration in the second stream on the first repository is of interest for the development on the second repository, (iii) replicating that second stream configuration to the second repository copy of the second stream and (iv) merging resulting copy of the second stream with the working stream on the second repository;

wherein the steps of replicating and merging further enables merge conflicts to be resolved, and a user to have a choice of which repository to perform software configuration management operations on including any of merging changes merging configurations and resolving merge conflicts.

13. A computer program product as claimed in claim 12 wherein each step of replicating minimizes number of versions that must be copied between the first and second repositories but maintains ability to merge configurations.

* * * * *